3,190,542
PRESSURE EXCHANGERS

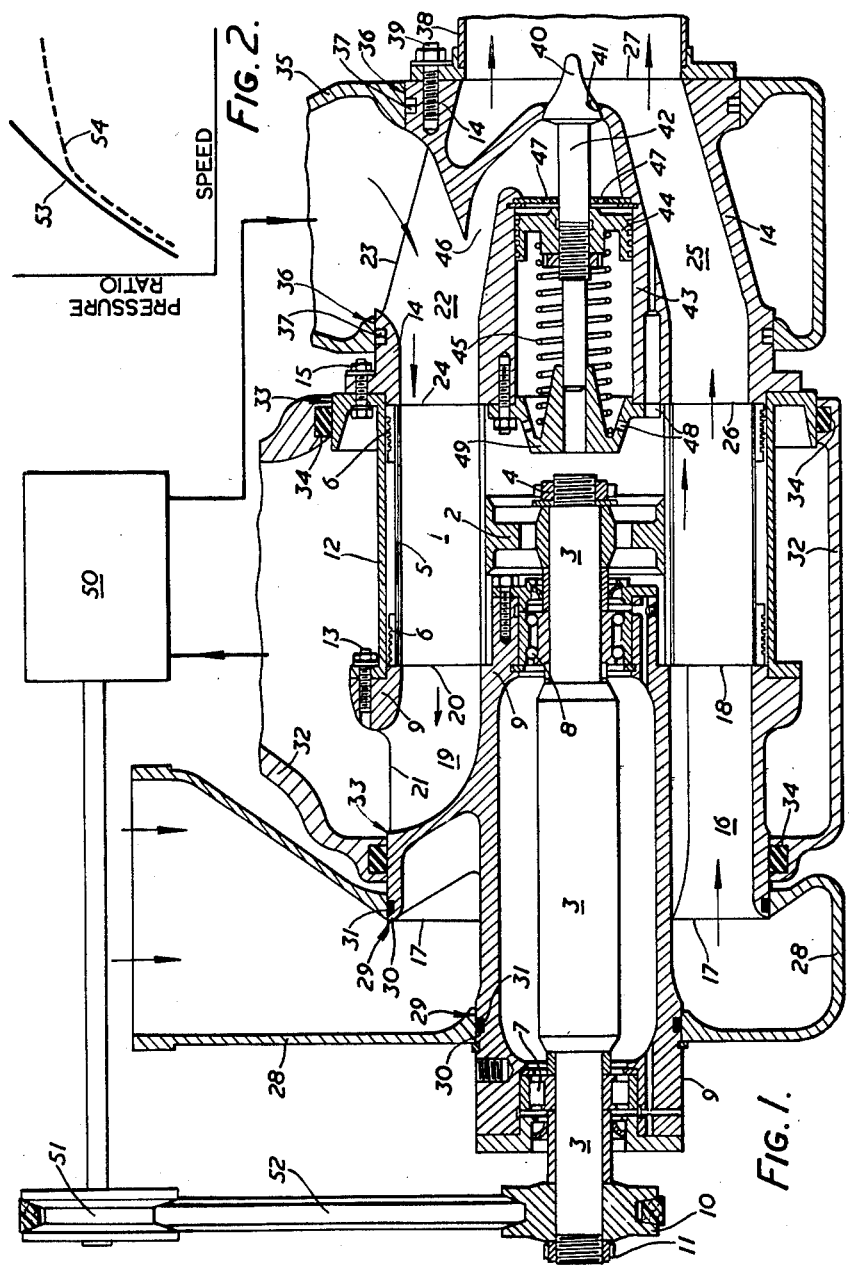

John Percy Vickery, Farnborough, England, assignor to Power Jets (Research & Development) Limited, London, England, a British company
Filed Jan. 15, 1962, Ser. No. 166,188
Claims priority, application Great Britain, Jan. 30, 1961, 3,538/61
3 Claims. (Cl. 230—69)

This invention relates to pressure exchangers.

The terms "pressure exchanger" is used herein to mean apparatus comprising cells, in which one fluid quantity expands, so compressing another fluid quantity with which it is in direct contact, passages to lead fluid at different pressures substantially steadily to and from the cells and means to effect relative motion between the cells and the passages.

The cells of a pressure exchanger are open-ended and are usually arranged in a circular array as a rotor. The rotor is customarily termed a "cell ring." The cell ring is normally journalled in stationary structure and may be either overhung or supported by bearings at each end.

In one form of pressure exchanger, fluid is introduced into the cells at a low-pressure scavenging stage and is compressed and scavenged from the cells at a high-pressure scavenging stage. This fluid is then reintroduced into the cells and expanded at the high-pressure scavenging stage, and is later scavenged from the cells at the low-pressure scavenging stage.

The inclusion of a pressure exchanger as an integer in a complete plant often requires the provision of tortuous and bulky external ducts. The tortuous nature of the ducts is dictated by the relative positions of the ends of the passages and complementary ends of the manifolds of the plant to which the ducts are connected. Furthermore, the disposition of the manifolds of the plant varies considerably between one form of plant and another, and even between one plant and another of the same general form, and it is desirable that the pressure exchanger fluid passages should be arranged to accommodate such variation. A further requirement is that differential thermal expansion between the external ducts and the stationary structure should not subject the stationary structure to undue stress and resultant distortion which might affect the critical clearance between the stationary structure and the cell ring. If the distortion has an angular component, then it may affect the angular location of the ends of the passages to lead fluid to and from the cells at one end of the cells relative to the angular location of the ends of the passages at the other end of the cells. Furthermore, distortion of the end-plate structure will cause distortion of any mechanism which may be housed in the end-plate, and so cause malfunction of that mechanism.

An object of the present invention is to provide a pressure exchanger which can be fitted readily to various forms of plant.

The invention is illustrated by way of example in the accompanying drawings, in which:

FIGURE 1 is a longitudinal section through a pressure exchanger according to the invention; and FIGURE 2 is a graph showing pressure ratio plotted against speed for a pressure exchanger arranged as an internal combustion engine supercharger.

Referring now to the drawings, a pressure exchanger shown in FIGURE 1 comprises a cell ring 1 mounted upon a support 2. The support 2 is secured to a shaft 3 by a nut 4, which engages a screwed end portion of the shaft. A shroud 5 of the cell ring 1 is provided with labyrinth seals 6 at each end of the ring. The shaft 3 is journalled in a roller bearing 7 and a double row angular contact ball bearing 8, both of which bearings are supported in stationary structure in the form of an end-plate 9. A pulley 10 is secured to the end of the shaft 3 remote from the ring 1 by a nut 11 which engages a screwed portion on the shaft. The end-plate 9 is secured to a cylindrical stator casing 12, surrounding the cell ring 1 by a ring of studs 13, only one of which is shown. The casing 12 is secured to another stationary structure, likewise in the form of an end-plate 14, by a ring of bolts 15, only one of which is shown.

A low-pressure inlet passage 16 in the end-plate 9 has an entry opening 17 at its end remote from the cell ring, and an exit opening 18 at its end adjacent the cell ring. A high-pressure outlet passage 19 has an entry opening 20 and an exit opening 21. A high-pressure inlet passage 22 in the end-plate 14 has an entry opening 23 and an exit opening 24, whilst a low-pressure outlet passage 25 has an entry opening 26 and an exit opening 27. The passages 16 and 25 constitute a low-pressure scavenging stage and the passages 19 and 22 constitute a high-pressure scavenging stage.

An external duct in the form of a low-pressure inlet volute 28 of generally annular form encircles the end-plate 9. The volute 28 has an entry opening at one end and an exit opening at the other end, which end also carries a pair of co-axial cylindrical sealing surfaces, one on each side of the exit opening. The sealing surfaces on the volute 28 are in sealing co-operation with a pair of cylindrical sealing surfaces 29 formed on the end-plate 9, co-axial with the axis of the shaft 3 and axially spaced apart with the entry opening 17 between them. The cylindrical surfaces 29 are provided with annular grooves 30 containing sealing means in the form of resilient rings 31. An external duct in the form of a high-pressure outlet volute 32 encircles the end-plate 9 and the casing 12 and is provided with a pair of co-axial cylindrical sealing surfaces which are located one on each side of the volute entry opening. The volute sealing surfaces which, in this case, have annular grooves 34 containing resilient sealing means in the form of synthetic rubber rings, are in sealing co-operation with sealing surfaces 33, similar to the sealing surfaces 29, on each side of the exit opening 21 in the end-plate 9. Similarly, an external duct in the form of a high-pressure inlet volute 35 has a pair of cylindrical sealing surfaces adjacent its exit opening in sealing co-operation with a pair of sealing surfaces 36 at the entry opening 23 in the end-plate 14. However, because of the temperatures prevailing in the high-pressure inlet volute 35 during operation of the pressure exchanger the sealing means in the grooves 37 cut in the sealing surfaces 36 take the form of piston rings. A low pressure outlet duct 38 is secured to the end-plate 14 by a ring of studs 39 (only one of which is shown) and is in communication with the passage 25 via the exit opening 27.

A spear valve 40, which normally closes a port 41 in the end-plate 14, is carried by a spindle slidably mounted in a cover 49 of a cylinder 43. The spindle 42 and the cylinder 43 are arranged so that their axes are coincident with the axis of the cell ring 1. The cylinder 43 is integral with the end-plate 14 and houses a piston 44 which is secured to the spindle 42. A spring 45 is located between the piston 44 and the cover 49 of the cylinder 43 and thus, the spring 45 urges the valve 40 to the closed position. One end of the cylinder 43 is open to the high-pressure inlet passage 22 via a by-pass passage 46 and orifices 47. The other end of the cylinder 43 is open to the low-pressure outlet passage 25 through passages 48.

An internal-combustion engine shown diagrammatically at 50 is arranged to be supercharged by the pressure exchanger and to drive the cell ring of the pressure exchanger. The inlet of the engine 50 is connected to the high-pressure outlet duct 32 of the pressure exchanger. The exhaust of the engine is connected to the high-pressure inlet duct 35 of the pressure exchanger. The crankshaft of the engine 50 is arranged to drive the cell ring of the pressure exchanger via the pulleys 51 and 10 and the belt 52.

The external ducts of the pressure exchanger hereinbefore described can be adjusted without difficulty to align them with the manifolds of an internal-combustion engine, the volutes 28, 32, 35 being moved around their respective sealing surfaces so that they are conveniently positioned relative to the manifolds of the internal-combustion engine. Furthermore, even when the volutes are fixed at their ends remote from the pressure exchanger, the pressure exchanger has some freedom of movement relative to the volutes in both axial and angular senses. Such movement may be caused by thermal stresses when the pressure exchanger is in operation and can be readily accommodated without lowering the efficiency of the seals.

In operation, the cell ring 1 is driven by the engine 50 and atmospheric air passes into the low-pressure volute 28 and through the passage 16 into cells opposite the exit opening 18. The engine exhaust gases pass into the high-pressure inlet volute 35 and so via the passage 22 into cells opposite the exit opening 24. Rotation of the cell ring 1 carries the cells containing atmospheric air from a position opposite the exit opening 18 to a position opposite the entry opening 20 and the exit opening 24. The engine exhaust gases entering the cells from the exit opening 24, expand, so compressing the air, which passes out of the cells into the entry 20 and flows via the passage 19 and the volute 32 into the engine 50. Further rotation of the cell ring 1 carries the cells containing exhaust gases to a position opposite the exit opening 18 and the entry opening 26, where the exhaust gases pass out of the cells into the entry opening 26, thus causing fresh air to be drawn into the cells from the exit opening 18. The exhaust gases pass via the passage 25 and the exit opening 27 into the low-pressure outlet duct 38 from which they are discharged to atmosphere.

The arrangement of an internal-combustion engine supercharged by a pressure exchanger as described above, can be used in an automotive application. In this case, the capacity of the pressure exchanger has to be matched with that of the engine, so that the engine will deliver a substantial proportion of its maximum torque over the lower part of the engine speed range. When this is done, it is found that, over the higher part of the speed range, the pressure ratio (and so the high-pressure outlet pressure) of the pressure exchanger becomes excessive. A typical curve of pressure ratio plotted against speed given by such an arrangement is shown at 53 in FIGURE 2. It is essential, therefore, to provide some control over the high-pressure outlet pressure of the pressure exchanger to give an operating curve as shown at 54, and this can be effected by the provision of the valve arrangement in the end-plate 14, the operation of which will now be described.

The pressure of the engine exhaust gases in the passage 22 is communicated to the cylinder on one side of the piston 41 via the passage 46 and the orifices 47. The other side of the piston 44 is subject to the lower pressure of the pressure exchanger exhaust gases in the passage 25, via the passages 48.

In operation, as the engine speed and the pressure of the engine exhaust gases increase, at a predetermined pressure, the piston 44 will move to compress the spring 45, thus moving the spear valve 40 to open the port 41. Some of the engine exhaust gases will then pass through the port 41 into the low-pressure exhaust duct 38, thus relieving the pressure in the passage 22 and consequently preventing excessive pressure occurring in the high-pressure outlet duct 32.

In supercharging applications, a pressure exchanger is normally arranged to provide a degree of overscavenging at the low-pressure scavenging stage in order to ensure that none of the engine exhaust gases remain in the cells and so contaminate the supply of induction air to the engine. In operation, as the pressure ratio of the pressure exchanger rises with increase in speed, the degree of overscavenging falls. In the embodiment described, the port 41 is so arranged in relation to the flow of the pressure exchanger exhaust gases in the passage 25, that the flow of the engine exhaust gases through the port 41 provides an ejector effect to assist the flow of the pressure exchanger exhaust gases in the passage 25 and thus assist scavenging of the cells at the low-pressure scavenging stage.

I claim:
1. A pressure exchanger, including:
 (a) an open-ended cell ring;
 (b) a stationary structure effective to close the ends of the cells but having therein passages, each with an entry opening at one end and an exit opening at the other, to provide means of communication with the cells;
 (c) means to rotate the cell ring;
 (d) means defining external ducts, each with an entry opening at one end and an exit opening at the other, mounted on the stationary structure in communication with the passages;
 (e) means defining a pair of co-axial cylindrical sealing surfaces on the stationary structure arranged around the axis thereof and spaced apart axially therealong with an opening of a passage in between;
 (f) means defining a pair of co-axial cylindrical sealing surfaces on at least one of the external duct defining means adjacent one end thereof and with the opening at said end in between the sealing surfaces forming the pair;
 (g) the sealing surfaces on the stationary structure and on the external duct defining means co-operating to permit relative adjustment between the external duct defining means and the stationary structure both in the direction of and angularly about the axis of the stationary structure, whilst maintaining an effective seal between the surfaces.

2. A pressure exchanger as claimed in claim 1, in which the common axis of the cylindrical surfaces is coincident with the axis of the cell ring.

3. A pressure exchanger as claimed in claim 1, in which one of the external ducts constitutes the sole support for the pressure exchanger, and in which the cylindrical surfaces are disposed so that a vertical line passing through the centre of gravity of the pressure exchanger passes between the two surfaces.

References Cited by the Examiner
UNITED STATES PATENTS

| | | | |
|---|---|---|---|
| 2,369,175 | 2/45 | Prince | 60—13 |
| 2,675,173 | 4/54 | Jendrassik | 230—69 |
| 2,766,928 | 10/56 | Jendrassik | 60—39.45 X |
| 3,012,708 | 12/61 | Berchtold et al. | 60—39.45 X |

SAMUEL LEVINE, *Primary Examiner.*

JULIUS E. WEST, *Examiner.*